(12) United States Patent
Jha et al.

(10) Patent No.: US 9,560,690 B2
(45) Date of Patent: Jan. 31, 2017

(54) INTERRUPTED HANDOFF RECONNECTION FOR LICENSED SHARED ACCESS

(71) Applicant: Intel Corporation, Santa Clara, CA (US)

(72) Inventors: Satish Chandra Jha, Hillsboro, OR (US); Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 14/293,426

(22) Filed: Jun. 2, 2014

(65) Prior Publication Data

US 2015/0351148 A1 Dec. 3, 2015

(51) Int. Cl.
*H04W 36/00* (2009.01)
*H04W 76/02* (2009.01)
(Continued)

(52) U.S. Cl.
CPC ....... *H04W 76/028* (2013.01); *H04W 36/0055* (2013.01); *H04W 36/14* (2013.01); *H04W 76/046* (2013.01); *H04W 76/06* (2013.01)

(58) Field of Classification Search
CPC .. H04W 76/028; H04W 76/06; H04W 76/046; H04W 36/0005; H04W 76/02; H04W 36/00; H04W 36/0055; H04W 36/0066; H04W 76/027; H04W 76/066; H04W 36/02; H04W 36/14; H04W 28/16; H04W 28/20; H04W 28/24; H04W 36/26; H04W 36/30; H04W 72/04; H04W 88/06; H04W 88/00; H04W 88/18; H04W 88/02; H04W 88/08
See application file for complete search history.

(56) References Cited

U.S. PATENT DOCUMENTS

2012/0276936 A1* 11/2012 Ahn ................. H04W 76/028
455/501
2013/0039338 A1* 2/2013 Suzuki ............. H04W 36/0094
370/331
(Continued)

FOREIGN PATENT DOCUMENTS

WO WO-2013096563 A1 6/2013
WO WO 2014/078676 A2 * 5/2014 ............ H04W 72/04
(Continued)

OTHER PUBLICATIONS

"International Application Serial No. PCT/US2015/028585, International Search Report mailed Aug. 24, 2015", 3 pgs.
(Continued)

*Primary Examiner* — Meless Zewdu
(74) *Attorney, Agent, or Firm* — Schwegman Lundberg & Woessner, P.A.

(57) ABSTRACT

A proposed 3GPP LTE protocol enhancement disclosed herein realizes the full benefit of proposed dynamic frequency sharing systems by enhancing current handoff signaling in a 3GPP LTE standard for optimized UE reconnection during interrupted handoff from Licensed Shared Access (LSA) frequency bands to Primary Long Term Evolution (LTE) frequency bands during loss of LSA spectrum resources. A User Equipment (UE) comprises a transceiver configured to determine a connection state during a loss of LSA frequency spectrum, transmit a reconnection request message when the UE is in a state of established connection or a connection request message when the UE is in an idle state, the request message carrying a loss of LSA frequency band cause, optimally connect according to the loss of LSA frequency band cause, to a primary LTE frequency band, and transmit a connection or reconnection complete message.

26 Claims, 5 Drawing Sheets

(51) Int. Cl.
*H04W 76/04* (2009.01)
*H04W 76/06* (2009.01)
*H04W 36/14* (2009.01)

(56) References Cited

U.S. PATENT DOCUMENTS

| | | | |
|---|---|---|---|
| 2014/0011509 A1 | 1/2014 | Markwart et al. | |
| 2014/0295820 A1* | 10/2014 | Kim | H04W 52/0216 455/418 |
| 2015/0092686 A1* | 4/2015 | Cui | H04W 76/028 370/329 |
| 2015/0281971 A1* | 10/2015 | Mueck | H04W 16/14 455/454 |

FOREIGN PATENT DOCUMENTS

| | | | |
|---|---|---|---|
| WO | WO-2014078676 A2 | 5/2014 | |
| WO | WO-2015187273 A1 | 12/2015 | |

OTHER PUBLICATIONS

"International Application Serial No. PCT/US2015/028585, Written Opinion mailed Aug. 24, 2015", 4 pgs.

* cited by examiner

US 9,560,690 B2

INTERRUPTED HANDOFF RECONNECTION FOR LICENSED SHARED ACCESS

TECHNICAL FIELD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. All multiple access wireless communication systems require sufficient access to available radio spectrum for supporting bearer service requirements.

Licensed Shared Access (LSA) is a new innovative framework that enables more efficient usage of available spectrum by allowing coordinated shared access to licensed spectrum for addressing spectrum shortage. Currently, there is no protocol provided in the 3GPP LTE standard for efficient reconnection of User Equipment (UE) to an Evolved Node B (eNB) on a primary LTE frequency band during interrupted handoff from a Licensed Shared Access (LSA) frequency band. Thus, in order to realize the full benefit of proposed dynamic frequency sharing systems, there is now a need for enhancements to current handoff signaling in a 3GPP LTE standard for UE reconnection during interrupted LSA handoff.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
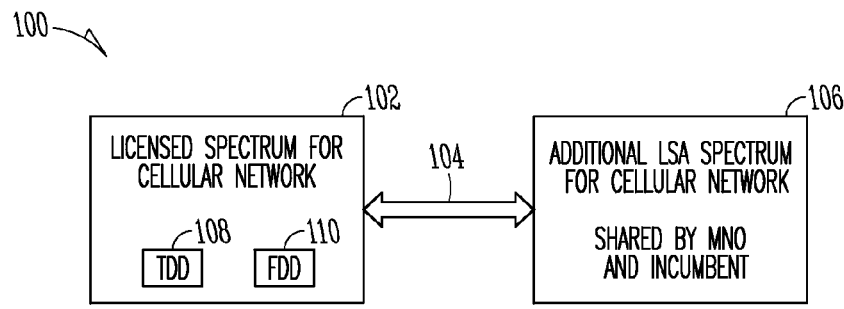
FIG. 1 shows an example of a high level block diagram for dynamic frequency sharing in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a "base station" or by some other similar terminology known in the art. An access terminal may also be called a "mobile station", a "user equipment" (UE), a wireless communication device or by some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations (e.g., Evolved Node Bs (eNodeBs)) of large and small cells can be configured to operate on different frequency bands. Frequency band(s), i.e., spectrum, adequate for the various types of communication content is required for a base station to connect to, or communicate with, other devices.

Licensed Shared Access (LSA) can significantly enhance the capacity of 3GPP LTE systems by providing a mechanism to extend available spectrum. Currently, a number of LTE compatible spectrum bands (e.g. 100 MHz in 2.3 GHz band, 100+ MHz in 2.6 GHz band) are being considered for LSA application. An LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e., network operators), such that a large portion of wireless spectrum that otherwise remains unused becomes available to network operators for meeting the ever increasing traffic demand over LTE networks.

Even with ongoing innovation to get more and more data rate from the available spectrum, projected traffic growth indicates that the mobile broadband operators will no longer be able to meet the demand with their fixed licensed spectrum because the pool of available spectrum for licensing is limited and cannot grow with the increasing demand. The LSA framework addresses this limitation by allowing an incumbent user, also known as Primary Spectrum Holder (PSH), to share coordinated access to an unused portion of its licensed spectrum with a group of secondary spectrum holders (SSH). The PSH however retains exclusive right to the spectrum and can reclaim the spectrum from SSHs. When using the LSA framework to acquire supplemental spectrum, LTE networks are required to adapt to the dynamic nature of the available spectrum by gracefully accommodating spectrum reclamations by PSHs.

An LTE base station E Node B (eNB) releases the LSA band once it is notified of an upcoming reclamation by the PSH. If a short grace period is given, the eNB may complete steps for the spectrum release within that time. One step of this process is to move, or hand over, LTE user equipments (UEs) that are connected to their eNBs through the LSA band to the LTE operator's primary LTE Band. In LSA enhanced LTE systems, handover of User Equipment (UE) to the operator's licensed primary LTE band upon reclamation of LSA band by the incumbent may be frequent. The eNB may not be allowed a grace period or sufficient time to instruct UEs on LSA band(s) to return to the primary LTE band, or the LSA band may become unavailable before completion of the handover process, resulting in lost connections between UEs and eNBs. UEs dropped during handoff in this manner are compelled to select and reconnect on their primary LTE bands. Current 3GPP specification require UEs to perform a complete RRC connection establishment/reestablishment process, incurring over the air signaling resource and other overhead penalties such as Radio Resource Control (RRC) and Non-Access-Stratum (NAS) security activations, and various bearer establishments.

Current 3GPP handover mechanisms are not designed for interrupted LAS handover scenarios. Without modification, the current handover dropped LSA handover mechanism creates a very sudden and large spike of over-the-air signaling in the radio access network and delayed reconnection. FIGS. 1-6 detail various handover signaling mechanisms for rapid reconnection during interrupted LSA handover of UEs from LSA bands having a reduced signaling overhead. A novel connection establishment/reestablishment cause in an RRC Connection Establishment/Reestablishment Request transmitted by a UE in the event its LSA band is reclaimed by the incumbent is introduced. The new connection establishment/reestablishment cause will inform the Evolved Universal Mobile Telecommunications System Terrestrial Radio Access Network (EUTRAN) that the UE is requesting to connect to a cell associated with its primary LTE band due to loss of LSA band. As both the LSA band and the primary LTE band are deployed as two cells in the same eNB, the EUTRAN minimizes the RRC connection establishment/reestablishment process by re-using information from the previous connection on the LSA band (such as established bearer's security parameters) for the new primary LTE band connection with the common eNB. The newly introduced connection establishment/reestablishment cause may be utilized to improve over-the-air signaling overhead and delay.

FIG. 1 shows a high level block diagram illustrating an example of dynamic LSA frequency sharing in a cellular network. FIG. 1 depicts an example of a system 100 that comprises a primary (legacy) LTE band 102 receiving spectrum from or returning spectrum to, at arrow 104, additional LSA frequency band 106. The primary LTE band 102 may include a Time Division Duplexing (TDD) band 108 or a Frequency Division Duplexing (FDD) band 110. The additional spectrum from the additional LSA frequency band 106 may also be TDD or FDD bands.

Figure 2:
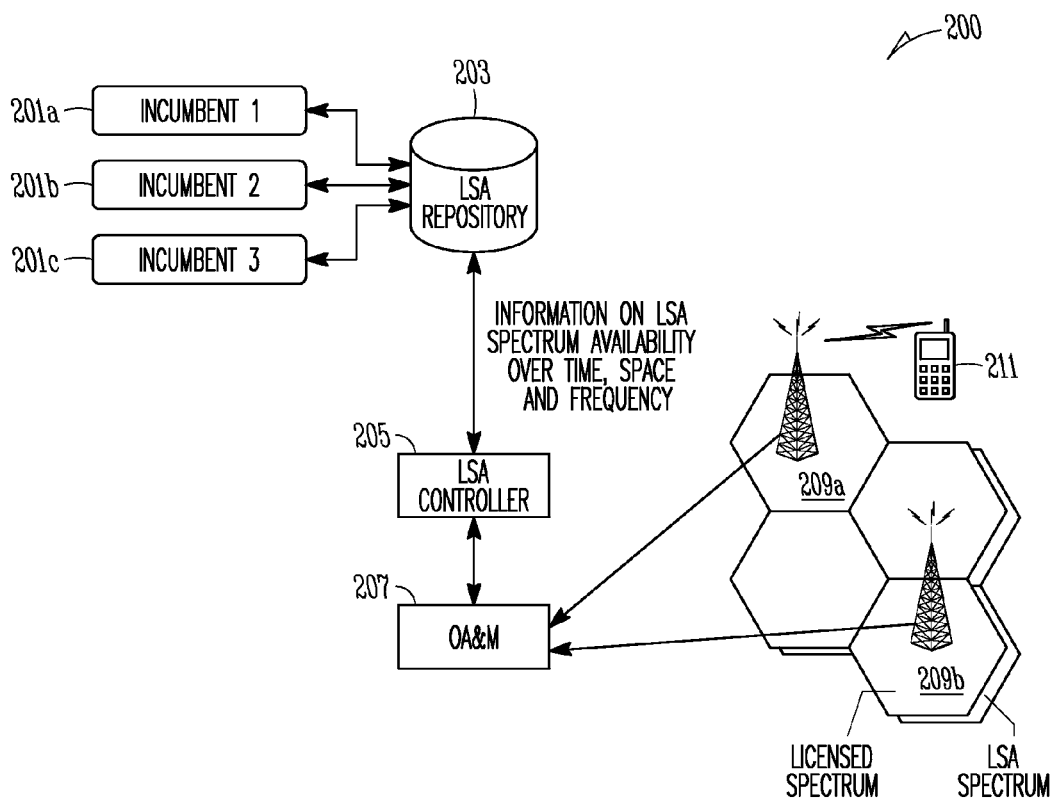
FIG. 2 shows a high level diagram illustrating an exemplary Licensed Shared Access (LSA) system, according to some embodiments.

FIG. 2 shows a high level diagram illustrating an exemplary traditional Licensed Shared Access (LSA) system 200. In a traditional LSA system, Incumbents 201a-c are original spectrum owners. An LSA Repository 203 is a data base containing information on spectrum availability and shorter term aspects of spectrum sharing. The LSA Repository 203 is communicatively coupled to an LSA controller 205, which performs information management and translates LSA Repository 203 data base contents into spectrum access conditions for LSA frequency licensees, while an Operator Administration and Management (OA&M) 207 provides operations, administration, and management for the network operator's network. The OA&M 207 manages limited short term additional spectrum for the network operator's eNBs, or base stations, 209a-b serving User Equipment(s) 211.

Figure 3:
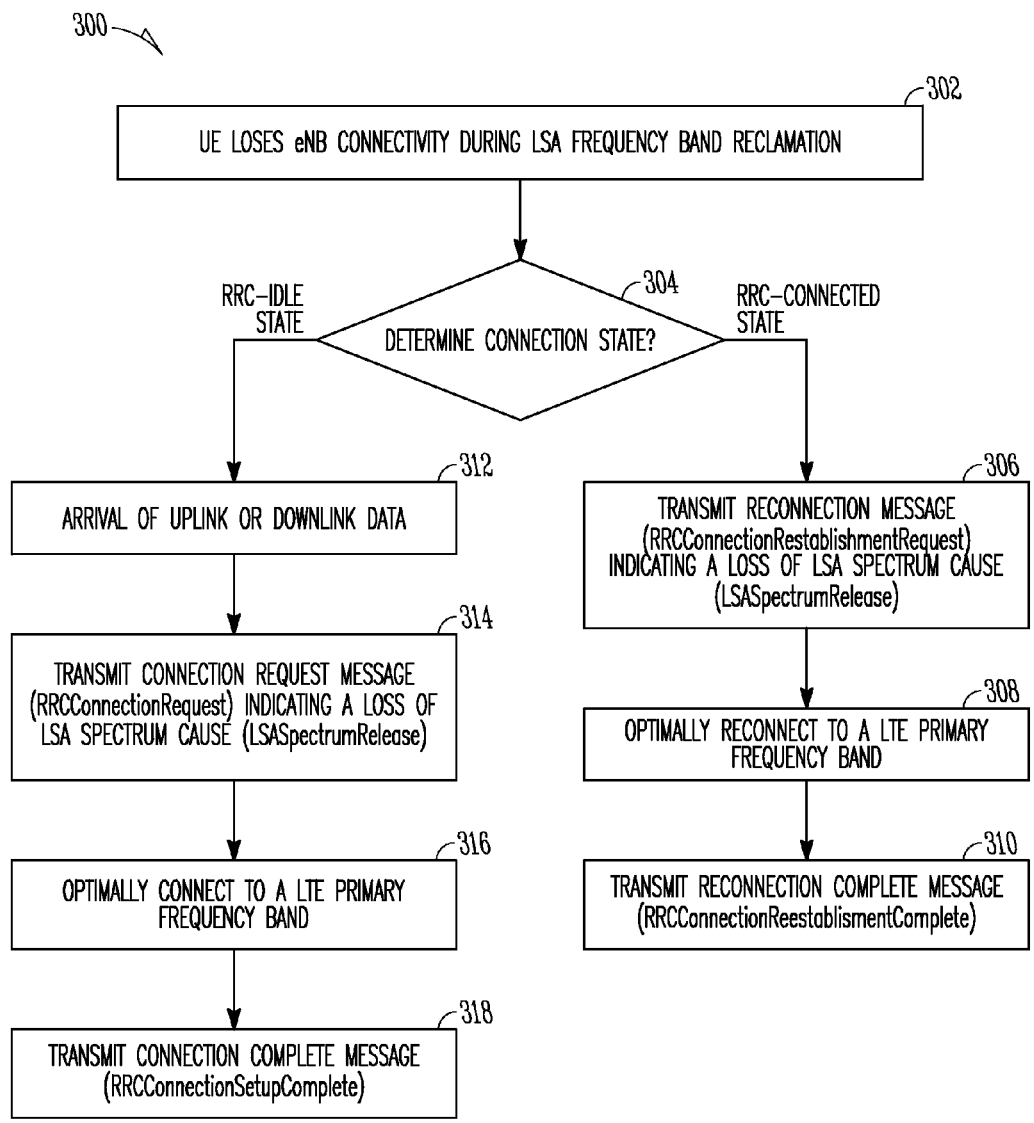
FIG. 3 is a high level overview flow chart illustrating Interrupted Handoff Reconnection for Licensed Shared Access, according to some example embodiments.

FIG. 3 is a high level overview flow chart illustrating a method 300 for Interrupted Handoff Reconnection for LSA by a UE 211, according to some example embodiments. An improved signaling mechanism is provided for reconnecting UEs 211 to their primary LTE bands 102 during dropped handoffs when LSA frequency bands 106 become unavailable, reducing the large amount of over the air traffic traditionally produced, as well as concomitant handoff latency experienced by users. A UE 211 may either have an established connection with its eNB 209, or be connected to its eNB 209 in an idle state when losing communication with the eNB 209 during LSA frequency band 106 reclamation.

A mechanism to inform the eNB 209 that the UE 211 is making a Radio Resource control (RRC) connection request because of LSA frequency band 106 release is realized by defining a new RRC connection establishment/reestablishment cause in the RRC Connection and Reestablishment Request messages. A novel connection establishment/reestablishment cause, LSASpectrumRelease in the RRC Connection Request and RRC Connection Reestablishment Request messages is provided for cases where UEs 211 lose established or idle connectivity on the LSA frequency band 106 because of LSA frequency band 106 reclamation by the incumbent 201. When UEs 211 have an established connection (i.e RRC-Connected state on an LSA frequency band 106) after the LSA band becomes unavailable, the RRC connection establishment/reestablishment cause is specified as the reestablishment cause in an RRC Connection Reestablishment Request message transmitted by the UE 211. EUTRAN may use the LSASpectrumRelease cause indication to minimize the RRC Connection Reestablishment process by reusing information such as established bearers and Access-Stratum/Non-Access-Stratum (AS/NAS) security parameters from the UE's 211 previous connection over the LSA frequency band 106. EUTRAN may also provide connection acceptance priority to UEs 211 handed off from an LSA frequency band 106 when informed of the loss and subsequent unavailability of the LSA frequency band 106.

When UEs 211 connected on an LSA frequency band 106 are in a RRC-Idle state during LSA frequency band 106 reclamation, the RRC connection establishment/reestablishment cause will be also be indicated as the establishment cause in an RRC Connection Request message. EUTRAN may use the LSASpectrumRelease cause indication to minimize the RRC Connection Establishment process. EUTRAN may also provide connection acceptance priority to UEs reconnecting from LSA frequency band(s) 106 due to unavailability of the LSA frequency band 106.

The disclosed RRC connection establishment/reestablishment methodology reduces over the air signaling overhead and connection establishment/reestablishment delays during LSA frequency band 106 reclamation by incumbents 201 in LSA enhanced LTE network systems 100. Current 3GPP specifications do not include LSA specific provisions for RRC connection/reconnection signaling, incurring higher than necessary over the air signaling overhead and reconnection delay during LSA frequency band 106 reclamation events. An exemplary method for Interrupted Handoff Reconnection for LSA is detailed in operations 302-318.

In operation 302, a UE 211 loses connectivity with its eNB 209 on an LSA frequency band 106 during LSA frequency band 106 reclamation by an incumbent 201. Control proceeds to operation 304. In operation 304, the UE 211 determines whether its eNB connection has a RRC-Connected state or a RRC Idle state. If the UE 211 is operating in a RRC-Connected state, control proceeds to operation 306. Otherwise, if the UE 211 is operating in an RRC-Idle state, control proceeds to operation 312.

In operation 306, the UE transmits a RRC Connection Reestablishment Request Message indicating an LSASpectrumRelease cause. Control proceeds to operation 308 where the UE 211 is optimally reconnected to its primary LTE primary frequency band 102 and then transmits a RRC Connection Reestablishment Complete message in operation 310.

In operation 312, the UE 211 waits for arrival of uplink or downlink data before transmitting a RRC Connection Request Message indicating an LSASpectrumRelease cause in operation 314. Control proceeds to operation 316 where the UE 211 is optimally connected to its primary LTE primary frequency band 102 and then transmits an RPC Connection Setup Complete message in operation 318.

Figure 4A:
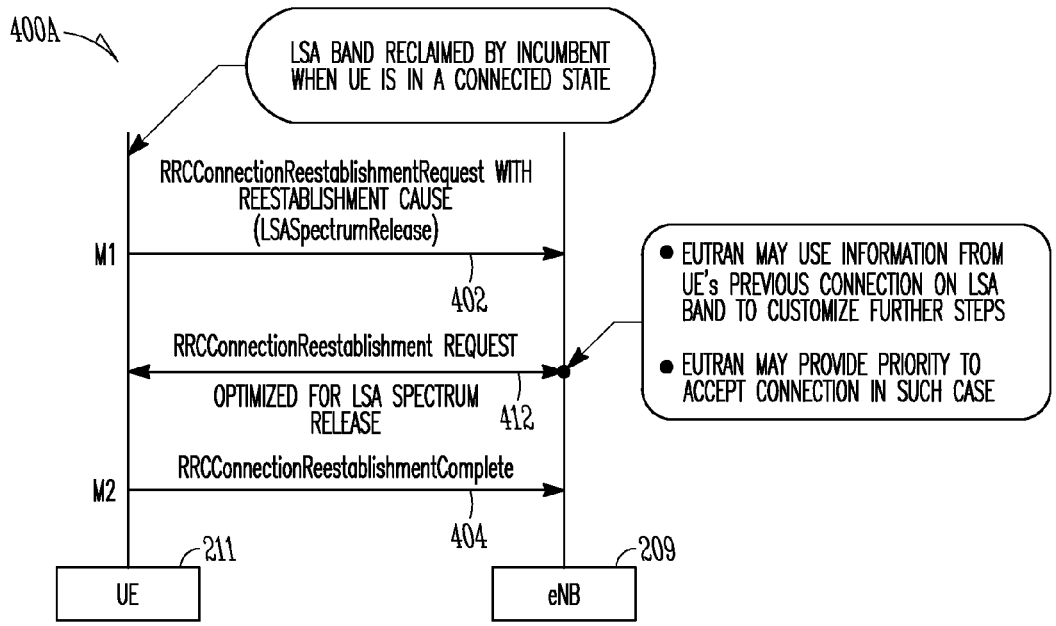
FIG. 4A illustrates an exemplary procedure for Interrupted Handoff Reconnection for LSA, according to some embodiments.

FIG. 4A depicts a messaging procedure diagram of a signaling and messaging mechanism for achieving UE 211 reconnection in response to interrupted handoff during impending loss of relinquished LSA spectrum resources performed by an eNB 209 arranged to send and receive Messages M1 402 and M2 404 as illustrated. UE 211 reconnection is performed when the UE is in a RRC-Connected state at the time of LSA frequency band 106 loss. If a UE 211 is connected to an eNB 209 on an LSA frequency band 106 when the LSA frequency band 106 is reclaimed, the RRC connection establishment/reestablishment cause is indicated as the LSASpectrumRelease cause in the RRC Connection Reestablishment Request message, M1 402, transmitted by the UE 211.

When the LSA frequency band 106 is reclaimed by an incumbent, and a Connected-state UE 211 is dropped due to LSA frequency band 106 loss, the UE 211 transmits a RRC Connection Reestablishment Request Message, M1 402, indicating an LSASpectrumRelease cause. An eNB 209 optimizes reconnection 412 of the UE 211 to an associated LTE primary frequency band 102. Optimization may include reuse of information from the UE's 211 previous connection to the LSA frequency band 106 in order to customize its procedure accordingly. eNB 209 may also provide connection acceptance priority to UE's 211 dropped during an established connection, The UE 211 transmits a RRC Connection Reestablishment Complete Message, M2 404, when it has been reconnected on a LTE primary frequency band 102.

The parameter fields of updated RRC Connection Reestablishment Request Message M1 402 are shown in Table 1.

TABLE 1

RRC Connection Reestablishment Request field descriptions physCellId
The Physical Cell Identity of the PCell the UE was connected to prior to the failure.
reestablishmentCause
Indicates the failure cause that triggered the re-establishment procedure. For example, LSASpectrum Release indicates that the UE was on LSA band which is taken back by incumbent users and therefore it is making a connection request.
ue-Identity
UE identity included to retrieve UE context and to facilitate contention resolution by lower layers.

Figure 4B:
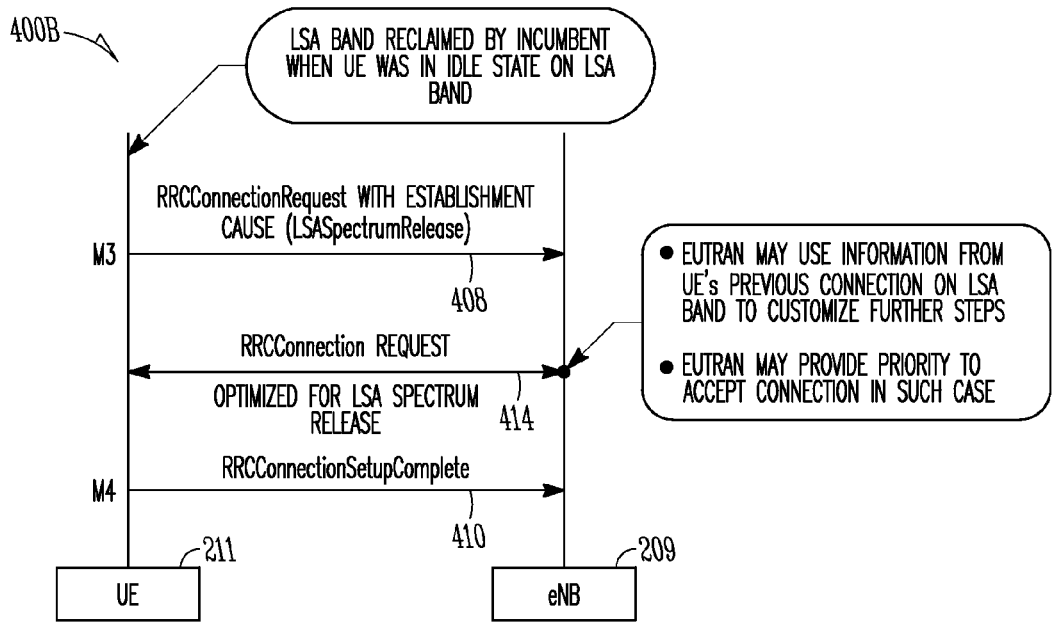
FIG. 4B illustrates an exemplary procedure for Interrupted Handoff Reconnection for LSA, according to some additional embodiments.

FIG. 4B depicts a messaging procedure diagram of a signaling and messaging mechanism for achieving UE 211 reconnection in response to an interrupted handoff during impending loss of relinquished LSA spectrum resources performed by an eNB 209 arranged to send and receive Messages M3 408 and M4 410 211 as illustrated. UE 211 connection is performed when the UE 211 is in a RRC-Idle state at the time of LSA frequency band 106 loss. If a UE 211 is connected to an eNB 209 on an LSA frequency band 106 when the LSA frequency band 106 is reclaimed, the RRC connection establishment/reestablishment cause is indicated as the LSASpectrumRelease cause in the RRC Connection Request message transmitted by the UE 211.

When the LSA frequency band 106 is reclaimed by an incumbent, and an Idle-state UE 211 is dropped due to LSA frequency band 106 loss, the UE 211 does not immediately request RRC Connection establishment. Rather, the UE 211 simply reselects the eNB 209 associated with LTE primary frequency band 102 and waits for downlink or uplink data arrival before making an RRC Connection Request.

At such time as the UE 211 experiences downlink or uplink data arrival, the UE 211 transmits a RRC Connection Request Message, M3 408, indicating an LSASpectrumRelease cause. The eNB 209 optimizes connection 414 of the UE 211 to an associated LIE primary frequency band 102, eNB 209 may also provide connection acceptance priority to UE's 211 dropped during an established connection. The UE 211 transmits an RRC Connection Setup Complete Message M4 410 when it has been reconnected on a LTE primary frequency band 102.

The parameter fields of updated RRC Connection Request Message M3 408 are shown in Table 2.

TABLE 2

RRC Connection Request field descriptions establishmentCause
Provides the establishment cause for the RRC connection request as provided by the upper layers. W.r.t. the cause value names:
highPriorityAccess concerns AC11 . . . AC15, 'mt' stands for 'Mobile Terminating ' and 'mo' for 'Mobile Originating. LSASpectrum Release indicates that the UE was previously on LSA band
random Value
Integer value in the range 0 to $2^{40} - 1$.
ue-Identity
UE identity included to facilitate contention resolution by lower layers.

Figure 5:
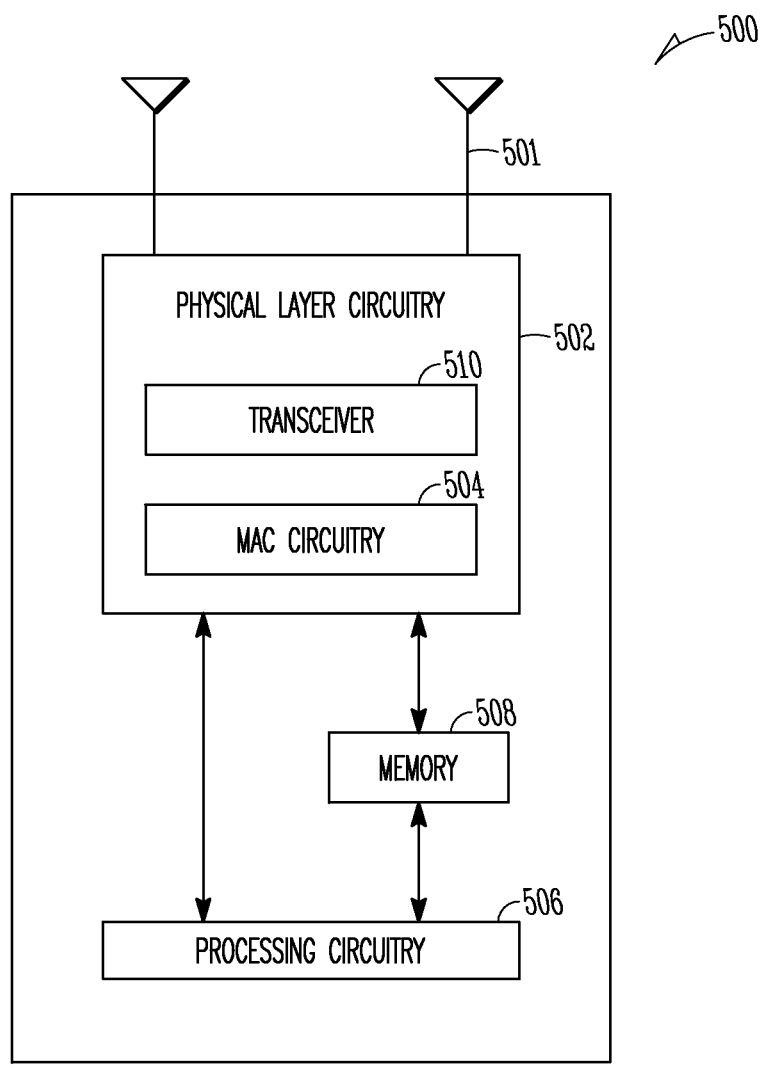
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station that may be suitable for use as an eNB 209 or UE 211 (FIG. 2) in accordance with some embodiments. The communication station 500 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device.

The communication station 500 may include physical layer circuitry 502 having a transceiver 510 for transmitting and receiving signals to and from other communication stations using one or more antennas 501. The physical layer circuitry 502 may also comprise medium access control (MAC) circuitry 504 for controlling access to the wireless medium. The communication station 500 may also include processing circuitry 506 and memory 508 arranged to perform the operations described herein. In some embodiments, the physical layer circuitry 502 and the processing circuitry 506 may be configured to perform operations detailed in FIGS. 3 and 4.

In accordance with some embodiments, the MAC circuitry 504 may be arranged to contend for a wireless medium and configure frames or packets for communicating over the wireless medium and the physical layer circuitry 502 may be arranged to transmit and receive signals. The physical layer circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory, including non-transitory memory, for storing information in a form readable by a machine (e.g., a computer). For example, a computer-readable storage device may include read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
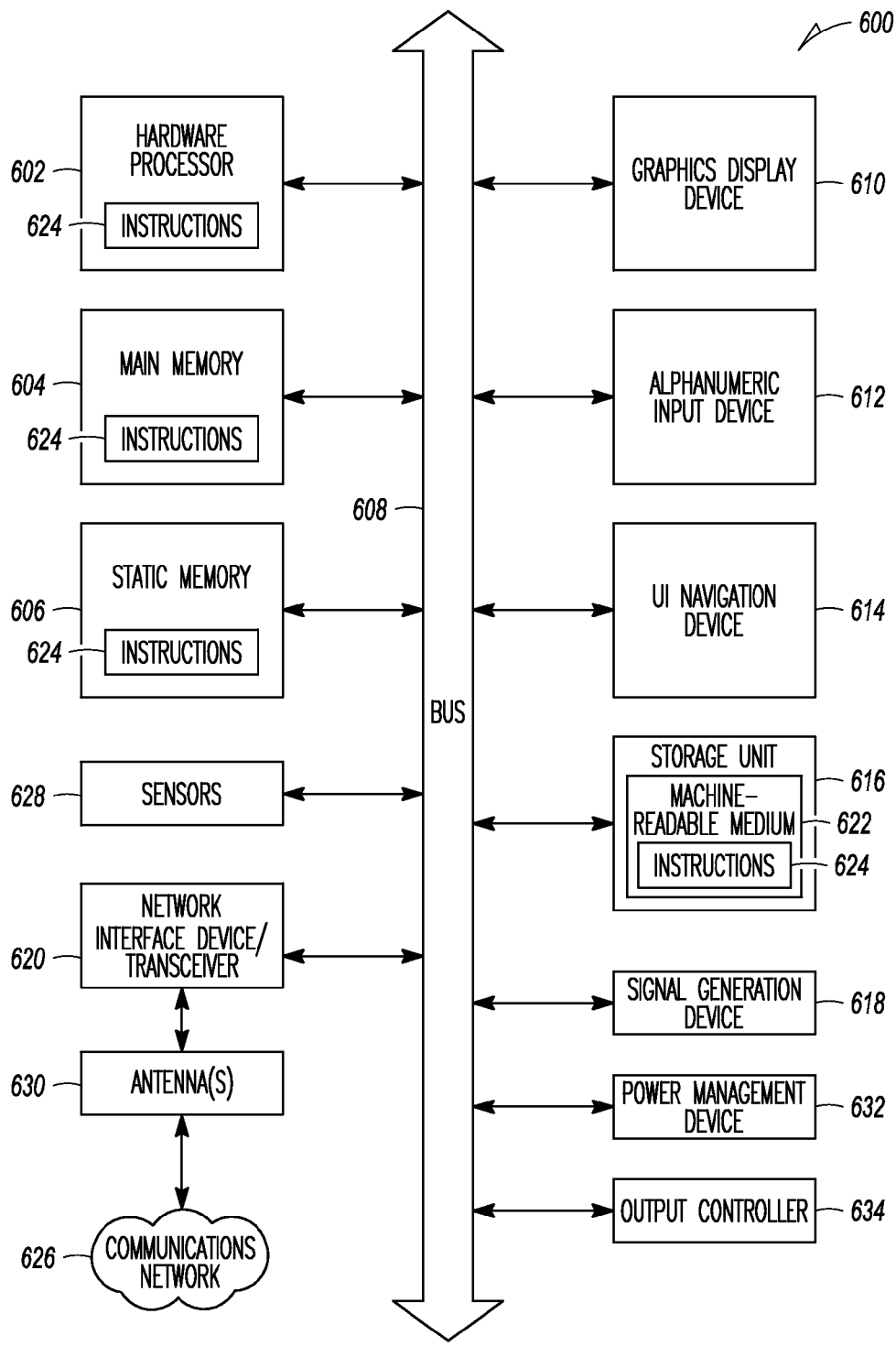
FIG. 6 shows a block diagram of an example of a machine upon which, one or more techniques (e.g., methods) discussed herein may be performed.

FIG. 6 illustrates a block diagram of an example machine 600 upon which any one or more of the techniques (e.g., methodologies) discussed herein may performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device (i.e., drive unit) 616, a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible media to facilitate communication of such software.

In one embodiment, a UE comprises a transceiver configured to determine a connection state during a loss of Licensed Shared Access (LSA) frequency spectrum, transmit a reconnection request message when the UE is in a state of established connection or a connection request message when the UE is in an idle state, the request message carrying a loss of LSA frequency band cause, optimally connect according to the loss of LSA frequency band cause, to a primary Long Term Evolution (LTE) frequency band, and transmit a connection or reconnection complete message.

In another embodiment, a non-transitory computer readable storage device includes instructions stored thereon, which when executed by a machine, cause the machine to perform operations to determine a connection state during a loss of Licensed Shared Access (LSA) frequency band spectrum, transmit a reconnection request message when a UE is in a state of established connection or a connection request message when the UE is in an idle state, carrying a loss of LSA frequency band cause, connect, optimally according to the loss of LSA frequency band cause, to a primary Long Term Evolution (LTE) frequency band, and transmit a connection or reconnection complete message.

In yet another embodiment, a EUTRAN is configured to receive a reconnection request message when a UE is in a state of established connection or a connection request message when the UE is in an idle state, the request message indicating a loss of LSA frequency band cause, instruct the UE to connect, optimally according to the loss of LSA frequency band cause, to a primary Long Term Evolution (LTE) frequency band; and receive a connection or reconnection complete message after the UE is optimally connected to the LTE primary frequency band.)

What is claimed is:

1. A User Equipment (UE) comprising:
   a transceiver; and
   a processor in communication with the transceiver and configured to:
   cause the transceiver to transmit a message requesting connectivity to an Evolved Node B (eNB), the message indicating a cause for transmission of the message, the cause indicated being a loss of Licensed Shared Access (LSA) frequency band due to reclamation of the LSA frequency band by an incumbent; and
   cause the transceiver to connect to the eNB on a primary Long Term Evolution (LTE) frequency band through use of a customized radio reconfiguration control (RRC) connection process that re-uses RRC connection information associated with the LSA frequency band, the use of the customized RRC connection process configured to reduce LTE signaling to connect to the eNB through the primary LTE frequency band as compared to LSA signaling used to connect to the eNB through the LSA frequency band,
   wherein reduced LSA signaling is used in an RRC connection establishment process when the UE is in an RRC-Idle state and a RRC connection reestablishment process when the UE is in an RRC-Connected state.

2. The UE of claim 1 wherein the RRC connection information that is re-used comprises established bearers and Access-Stratum/Non-Access-Stratum (AS/NAS) security parameters.

3. The UE of claim 1 wherein:
   in response to the loss of LSA frequency band during handover when the UE is in an RRC-Idle state, the processor and transceiver are further configured to reselect an eNB associated with the LTE primary frequency band and subsequently wait for arrival of uplink or downlink data before transmitting a RRC Connection Request message indicating the cause.

4. The UE of claim 1 wherein RRC connection establishment acceptance priority when the UE is in the RRC-Idle state and RRC connection reestablishment acceptance priority when the UE is in the RRC-Connected state is provided to the UE based on the loss and subsequent unavailability of the LSA frequency band.

5. The UE of claim 1 wherein the loss of LSA frequency band is indicated in the message through use of "LSASpectrumRelease" as the cause.

6. The UE of claim 1 wherein the processor is further configured to cause the transceiver to transmit:
   a RRC Connection Setup Complete message after connection to the primary LTE frequency band when the UE operated in a previous state of RRC-Idle, and
   a RRC Connection Reestablishment Complete message after connecting to the primary LTE frequency band when the UE operated in a previous state of RRC-Connected.

7. The UE of claim 1 wherein the message is transmitted prior to reception of an instruction from the eNB within a grace period after the reclamation of the LSA frequency band, the instruction to indicate to the UE to return to the primary LTE frequency band.

8. The UE of claim 1 wherein
   the RRC connection process comprises one of:
   an RRC Connection Reestablishment Request message that comprises parameters comprising a physical cell identity of a primary cell to which the UE was connected prior to the reclamation, an indication of a cause of failure that triggered the RRC Connection Reestablishment Request message, and an identity of the UE to retrieve UE context and to facilitate contention resolution by lower layers, or
   an RRC Connection Establishment Request message that comprises parameters comprising an establishment cause of failure, as provided by upper layers, that triggered the RRC Connection Establishment Request, and the identity of the UE.

9. A non-transitory computer readable storage device including instructions stored thereon, which when executed by one or more processor(s) of a User Equipment (UE), cause the UE to perform operations to:
   in response to reclamation of a Licensed Shared Access (LSA) frequency band by an incumbent, transmit a message requesting connectivity to an Evolved Node B (eNB), the message indicating loss of the LSA frequency band as a cause for transmission of the message; and
   connect to the eNB on a primary Long Term Evolution (LTE) frequency band through re-use of RRC connection information associated with the LSA frequency band.

10. The non-transitory computer readable storage device of claim 9 wherein the RRC connection information that is re-used comprises established bearers and Access-Stratum/Non-Access-Stratum (AS/NAS) security parameters.

11. The non-transitory computer readable storage device of claim 9 further including instructions thereon to further cause the UE to perform operations, in response to the loss of LSA frequency band during handover when the UE is in an RRC-Idle state, to reselect an eNB associated with the LTE primary frequency band and subsequently to wait for arrival of uplink or downlink data before transmitting a RRC Connection Request message indicating the loss of LSA frequency band as the cause.

12. The non-transitory computer readable storage device of claim 9 further including instruction thereon to further cause the UE to perform operations to transmit:
   a RRC Connection Reestablishment Request message indicating the loss of LSA frequency band as the cause when the UE is operating in a RCC-Connected state,
   a RRC Connection Request message indicating the loss of LSA frequency band as the cause when the UE is operating in an RRC-Idle state,
   a RRC Connection Setup Complete message after connection to the primary LTE frequency band when the UE operated in a previous RRC-Idle state, and
   a RRC Connection Reestablishment Complete message after connecting to the primary LTE frequency band when the UE operated in a previous RRC-Connected state.

13. The non-transitory computer readable storage device of claim 9 wherein the loss of LSA frequency band is indicated in the message through use of "LSASpectrumRelease"as the cause.

14. The non-transitory computer readable storage device of claim 9 wherein an RRC connection establishment acceptance priority when the UE is in an RRC-Idle state and an RRC connection reestablishment acceptance priority when the UE is in an RRC-Connected state is provided to the UE based on loss and subsequent unavailability of the LSA frequency band.

15. The non-transitory computer readable storage device of claim 9 wherein the message is transmitted prior to reception of an instruction from the eNB within a grace period after the reclamation of the LSA frequency band, the instruction to indicate to the UE to return to the primary LTE frequency band.

16. Evolved Node B (eNB) comprising:
a transceiver; and
a processor in communication with the transceiver and configured to:
cause the transceiver to receive a message from a User Equipment (UE) requesting connectivity, the message indicating loss of Licensed Shared Access (LSA) frequency band due to reclamation of the LSA frequency band by an incumbent as a cause for the message, the message being received prior to transmission of an instruction to the UE within a grace period after reclamation of the LSA frequency band, the instruction to indicate to return to a primary Long Term Evolution (LTE) frequency band; and
cause the transceiver to instruct the UE to connect on the primary LTE frequency band through the use of a customized radio reconfiguration control (RRC) connection process that re-uses RRC connection information associated with the LSA frequency band.

17. The eNB of claim 16 wherein the RRC connection information that is re-used comprises established bearers and Access-Stratum/Non-Access-Stratum (AS/NAS) security parameters.

18. The eNB of claim 16 wherein the processor is further configured to cause the transceiver:
to receive a RRC Connection Reestablishment Request message carrying the loss of LSA frequency band as a cause when the UE is operating in a RCC-Connected state, and
to receive a RRC Connection Request message indicating the loss of LSA frequency band cause when the UE is operating in an RRC-Idle state.

19. The eNB of claim 16 wherein the loss of LSA frequency band is indicated in the message through use of "LSASpectrumRelease" as the cause.

20. The eNB of claim 16 wherein the processor is further configured to cause the transceiver:
to receive a RRC Connection Setup Complete message after connection by the UE to the primary LTE frequency band when the UE operated in a previous state of RRC-Idle, and
to receive a RRC Connection Reestablishment Complete message after connection by the UE to the primary LTE frequency band when the UE operated in a previous state of RRC-Connected.

21. The eNB of claim 16 wherein the processor is further configured to cause the transceiver to:
provide to the UE, based on the loss and subsequent unavailability of the LSA frequency band,
an RRC connection establishment acceptance priority when the UE is in the RRC-Idle state, and
an RRC connection reestablishment acceptance priority when the UE is in the RRC-Connected state,
to prioritize connection establishment or reestablishment of the UE.

22. A method for establishing connectivity after a loss of Licensed Shared Access (LSA) frequency band comprising operations to:
transmit a message requesting connectivity to an Evolved Node B (eNB), the message indicating a cause for transmission of the message, the cause indicated being loss of Licensed Shared Access (LSA) frequency band due to reclamation of the LSA frequency band by an incumbent; and
connect to the eNB on a primary Long Term Evolution (LTE) frequency band through re-use of radio reconfiguration control (RRC) connection information associated with the reclamation of the LSA frequency band.

23. The method of claim 22 wherein the RRC connection information that is re-used comprises established bearers and Access-Stratum/Non-Access-Stratum (AS/NAS) security parameters.

24. The method of claim 22 her comprising operations to, in response to the loss of LSA frequency band during handover when the UE is in an RRC-Idle state, reselect an eNB associated with the LTE primary frequency band and subsequently wait for arrival of uplink or downlink data before transmitting a RRC Connection Request message indicating the loss of LSA frequency band as the cause.

25. The method of claim 22 further comprising operations to:
provide to the UE, based on the loss and subsequent unavailability of the LSA frequency band,
an RRC connection establishment acceptance priority when the UE is in the RRC-Idle state, and
an RRC connection reestablishment acceptance priority when the UE is in the RRC-Connected state,
to prioritize connection establishment or reestablishment of the UE.

26. The method of claim 22 further comprising wherein the loss of LSA frequency band is indicated in the message through use of "LSASpectrumRelease" as the cause.

* * * * *

UNITED STATES PATENT AND TRADEMARK OFFICE
CERTIFICATE OF CORRECTION

PATENT NO. : 9,560,690 B2  
APPLICATION NO. : 14/293426  
DATED : January 31, 2017  
INVENTOR(S) : Jha et al.

Page 1 of 1

It is certified that error appears in the above-identified patent and that said Letters Patent is hereby corrected as shown below:

In the Claims

Column 12, Line 44, Claim 12, delete "RCC-Connected" and insert --RRC-Connected-- therefor Column 12, Line 57-58, Claim 13, delete ""LSASpectrumRelease"as" and insert --"LSASpectrumRelease" as-- therefor Column 13, Line 5, Claim 16, before "Evolved", insert --An--

Column 13, Line 32, Claim 18, delete "RCC-Connected" and insert --RRC-Connected-- therefor Column 14, Line 29, Claim 24, delete "her" and insert --further-- therefor Signed and Sealed this  
Fourteenth Day of April, 2020

Andrei Iancu  
*Director of the United States Patent and Trademark Office*